United States Patent

Matsumaru et al.

[19]

[11] Patent Number: 5,818,673
[45] Date of Patent: Oct. 6, 1998

[54] ELECTRIC POWER DISTRIBUTION SYSTEM HAVING FAULT BYPASS FEATURE

[75] Inventors: Akio Matsumaru; Motonori Kido; Yoshiyuki Miyazaki; Hideaki Toyama, all of Nagoya, Japan

[73] Assignees: Harness System Technologies Research, Ltd., Nagoya; Sumitomo Wiring Systems, Ltd., Yokkaichi; Sumitomo Electric Industries, Ltd., Osaka, all of Japan

[21] Appl. No.: 825,911

[22] Filed: Apr. 2, 1997

[30] Foreign Application Priority Data

Apr. 4, 1996 [JP] Japan .................................. 8-082893

[51] Int. Cl.⁶ .................................................. H02H 3/00
[52] U.S. Cl. ........................... 361/63; 361/62; 307/10.1; 307/18; 307/31
[58] Field of Search ............................ 361/63; 307/10.1, 307/18, 31

[56] References Cited

U.S. PATENT DOCUMENTS

| | | | |
|---|---|---|---|
| 5,214,311 | 5/1993 | Kageyama et al. | 307/18 |
| 5,396,395 | 3/1995 | Tanimuzu | 361/166 |
| 5,570,002 | 10/1996 | Castleman | 323/283 |
| 5,675,189 | 10/1997 | Anma et al. | 307/9.1 |
| 5,701,226 | 12/1997 | Gelbien et al. | 361/63 |

FOREIGN PATENT DOCUMENTS 5-146080  6/1993  Japan .

*Primary Examiner*—Jeffrey A. Gaffin
*Assistant Examiner*—Kim Huynh
*Attorney, Agent, or Firm*—Oliff & Berridge, PLC

[57] ABSTRACT

An electric power distribution system is shown where even if supply of electric power is interrupted, other normal electric part systems can be operated. A number of electric power distribution portions are supplied with electric power through at least two systems of electric power lines. The amounts of electric currents in the two systems of the trunk lines respectively are detected and monitored by a sensor and each current detection portion. Moreover, a controller controls a switch corresponding to a sensor which has detected an abnormal value among output values from a number of current detection portions to make non-conductive the trunk line from which the abnormal value has been detected. If a fault takes place in, for example, the trunk line between the electric power distribution portions, the two ends of the trunk line respectively are disconnected by the switch. Moreover, electric power is supplied from another electric power distribution portion through the residual electric power line of the two systems of the electric power lines.

13 Claims, 11 Drawing Sheets

ELECTRIC POWER DISTRIBUTION SYSTEM HAVING FAULT BYPASS FEATURE

1. Field of Invention

The present invention relates to an electric power distribution system adaptable to, for example, a vehicle, and having electric power distribution portions for controlling distribution and supply of electric power to various electric equipment units.

2. Description of Related Art

Hitherto, an electric power distribution system to be mounted on, for example, a vehicle is structured to supply electric power to a variety of loads, such as electric parts through various switching operations so as to operate the electric parts. The positions of the switches and the various loads on the vehicle have been schematically determined as shown in FIG. 6.

FIG. 6 is a schematic drawing of a car body to illustrate the structure for supplying electric power performed by a conventional electric power distribution system for a vehicle.

Referring to FIG. 6, a car body 1 is sectioned into an engine room 2 formed in the front portion thereof and having, for example, an engine mounted thereon; a passenger space 3 formed in the rear of the engine room 2 and including a driver seat and a passenger seat; and a trunk room 4 formed in the rear of the passenger space 3. In the engine room 2, there are formed a power supply portion including a battery 5 and an alternator 6 for supplying electric power having predetermined voltage; an electric connection box 7 which is a junction box (J/B) connected to the power supply portion and arranged to distribute electric power supplied from the power supply portion; and various loads, such as lamps 8 including head lamps and tail clearance lamps. In the passenger space 3, there are formed an electric connection box 9 which is a junction box (J/B) connected to the electric connection box 7 and arranged to distribute electric power supplied from the electric connection box 7 to the various loads; meter illuminations 10 which are the loads; illumination 11 for audio units; and various switches 12 which can be operated. Moreover, the trunk room 4 includes lamps 13, such as back lights, which are loads connected to the electric connection box 9.

The battery 5 can be electrically charged and capable of discharging electric power and structured to serve as a source to supply electric power to, for example, an engine start motor when the engine is not already operating. The alternator 6 generates electric power when the engine is rotated, thus serving as a power supply source when the engine is rotated. The electric parts, such as an air conditioner and the head lamps, which consume large amounts of electric power, are arranged such that the engine speed is changed to correspond to the supply of electric power generated by the alternator 6 to be adaptable to the frequency of use and the electric power consumption.

The electric connection boxes 7 and 9 are provided with current limit circuits serving as protective circuits, such as a fuse 14 and a fusible link (F/L) 15, and switching circuits, such as a relay circuit 16.

The foregoing lamps 8 and 13, the meter illuminations 10, the audio illuminations 11, the air conditioner, a cigar lighter and the relay circuit 16 are the electric parts serving as the various loads. Moreover, lamps, such as a room lamp and various warning lamps, an engine control system and operation motors such as the engine start motor are provided as the loads. The foregoing various loads are respectively branched from the electric connection boxes 7 and 9 so as to be operated with electric power supplied from the power supply portion through the electric connection boxes 7 and 9 when a driver operates a required operation switch.

The electric parts, such as the air conditioner, of a type requiring a large electric current are arranged to not be directly operated by the operation switch. The foregoing electric parts are arranged to be electrically connected through a relay contact having a large current capacity or a semiconductor power switch or the like.

Although only the electric connection box 7 and the electric connection box 9 connected to the electric connection box 7 are described as the electric connection box, another electric connection box connected to the electric connection box 7 may be provided in addition to the electric connection box 9.

FIG. 7 is a block diagram showing the structure of a conventional electric power distribution system to be mounted on a vehicle, and FIG. 8 is a circuit diagram showing an essential portion of the electric power distribution system to be mounted on a vehicle shown in FIG. 7.

Referring to FIGS. 7 and 8, a power supply portion 23 consisting of a battery 21 and an alternator 22, is connected to an electric connection box 24, which is a junction box (J/B). Electric power supplied from the battery 21 is distributed through a protective circuit, which is a fusible link (F/L) 25 for the electric connection box 24. Electric power supplied from the alternator 22 is distributed through protective circuits, which are fusible links (F/L) 26 for the electric connection box 24. One of the distribution lines is connected to another electric connection box 27, which is a junction box (J/B), through the fusible link (F/L) 26. Electric power supplied from the electric connection box 24 is distributed through another protective circuit, which is a fuse 28, for the electric connection box 27. One of the distribution lines is, through a splice 29 and so forth, connected to electric part systems 30 serving as the various loads. Electric power supplied from the protective circuit for the electric connection box 27 is further distributed by the splice 29 and so forth so as to be distributed to each of the electric part systems 30.

Each of the electric part systems 30 is composed of an operation switch (SW) 31, a distribution means 32 to which the operation switch 31 is connected, and electric parts, for example, lamps 33, which are the various loads to which the distribution means 32 is connected. The lamps 33 are connected to a body ground 35 for the vehicle through a ground connection portion 34.

As a result of the above-mentioned structure, electric power supplied from the power supply portion 23 is, through the fusible links (F/L) 25 and 26 in the electric connection box 24, supplied to the fuse 28 which is the protective circuit in the electric connection box 27. Then, electric power is distributed by the splice 29 and so forth, and then electric power above is supplied to the electric part systems 30. At which time, when the operation switch 31 is closed, electric power is supplied to the lamps 33 which are the various loads, that is, the electric parts so that the lamps 33 are turned on.

The above-mentioned conventional electric power distribution system to be mounted on a vehicle, as shown in FIGS. 9 and 10, sometimes encounters generation of a short circuit because the conductor of the electric line comes in contact with an external conductor due to deterioration in the wiring passage for the wire harness or the like, and the conductor's peripheral portion is worn as a result of use of the wire harness on the vehicle or the like for a long time or during impact. In the example shown in FIG. 9, a short circuit is generated in the lamp 33*a* which is an electric part serving as one of the various loads, causing a fuse 28*a*, which is the protective circuit disposed upstream of the lamp 33*a*, to be blown. As a result, for example, a lamp portion surrounded by a dashed line is made to be an operation interrupted portion 35. In the case shown in FIG. 10, a trunk line portion between the electric connection boxes 24 and 27 encounters a short circuit, thus causing the fusible link (F/L) 26 disposed upstream and serving as the protective circuit to be blown. As a result, a portion surrounded by a dashed line is made to be an operation interrupted portion 36.

If a fault, such as a short circuit, takes place, an electric current greater than the normal electric current consumption (electric current value which is used usually) for all of the loads connected to a wiring passage is allowed to flow in the wiring passage for the wire harness or the like. It leads to the fuse 28*a* or the fusible line (F/L) 26*a*, disposed upstream from the position at which the fault, such as a short circuit, takes place, and serving as the protective circuit, being blown. Thus, supply of electric power to the downstream position, at which the short circuit has taken place, is interrupted so that a secondary disaster, such as a fire, is prevented.

However, since the plurality of the various loads are disposed in the operation interrupted portions 35 and 36 downstream from the fused fuse 28*a* or the fusible line (F/L) 26*a*, supply of electric power to the normal electric part system is unintentionally interrupted. As a result, there arises a problem in that the normal electric part system cannot be operated when required. If the normal electric part, the operation of which has been inhibited, is a system required to drive the vehicle, there arises a problem in that, for example, the vehicle cannot be moved to a safety position though the system is in a normal state.

SUMMARY OF THE INVENTION

An object of the present invention is to provide an electric power distribution system which is capable of causing normal electric part systems to be operable even if supply of electric power is interrupted by a protective circuit.

An electric power distribution system according to the present invention comprises: a plurality of electric power distribution portions for distributing electric power to a plurality of various loads; and a power supply portion connected to at least any one of the plural electric power distribution portions such that the plural electric power distribution portions are able to supply electric power through at least two systems of electric lines. The electric power distribution portions are provided with a plurality of detection portions for respectively detecting levels of electric currents in the at least two systems of the electric lines. Plural switch means are provided for respectively permitting/interrupting electric conduction through the at least two systems of the electric lines. A control unit is provided for controlling the switch means corresponding to the detection portion among the plural detection portions which has output an abnormal value. The control unit operates the switch means to cut off electric power to the electric line from which the abnormal value has been detected. It is preferable that the control unit controls the switch means corresponding to the detection portion among the plural detection portions which has output an abnormal value so as to cut off electric power to the electric line from which the abnormal value has been detected and to perform switching to one of the at least two systems of electric lines which does not include the electric line which has been made non-conductive.

As a result of the above-mentioned structure, the plurality of the electric power distribution portions are structured to be capable of supplying electric power through at least two systems of the electric lines. Each detection portion detects and monitors the amount of electric current in the two systems of the electric lines. Moreover, the control unit controls the switch means corresponding to the detection portion, which has detected an abnormal value in the output values from the plural detection portions, to make non-conductive the electric line from which the abnormal value has been detected. Therefore, if a fault, such as a short circuit takes place in, for example, an electric line between the electric power distribution portions, the two ends of the electric line can be disconnected by the switch means. Moreover, electric power can be supplied from the other electric power distribution portion through the residual electric line of the two systems of the electric lines. As described above, even if supply of electric power from the electric power distribution portion through one of the electric lines is interrupted by the switch means serving as the protective circuit, supply of electric power can be performed through the residual one of the two systems of the electric current passages. Therefore, electric power can be supplied to downstream normal electric part systems to permit the operation.

An electric power distribution system according to the present invention comprises: a plurality of electric power distribution portions for distributing electric power to a plurality of various loads; and a power supply portion connected to at least any one of the plural electric power distribution portions such that the plural electric power distribution portions are respectively supplied with electric power through electric lines, wherein the electric power distribution portions are provided with a plurality of detection portions for respectively detecting levels of electric currents in the electric lines for supplying electric power to the plurality of the various loads, plural switch means for respectively permitting/interrupting electric conduction of the electric lines for supplying electric power to the plurality of the various loads and a control unit for controlling the switch means corresponding to the detection portion among the plural detection portions which has output an abnormal value so as to make non-conductive the electric line from which the abnormal value has been detected.

As a result of the above-mentioned structure, each detection portion detects and monitors the amount of the electric current for each of the electric lines for supplying electric power to the plurality of the various loads. Moreover, the control unit controls the switch means corresponding to the detection portion which has detected an abnormal value among the output values from the plural detection portions to make non-conductive the electric line from which the abnormal value has been detected. Therefore, even if a fault, such as a short circuit, has taken place in any one of the various load and the electric lines connected to the loads, only the load or the electric line connected to the load which has encountered the fault can be disconnected by the switch means. Moreover, electric power can be supplied to the normal loads connected to the other electric lines and their electric lines.

It is preferable that the structure be formed such that at least either the content of a control signal to switch the switch means off or an indication of where electric power has been supplied, is recorded. It is preferable that the control unit is structured to issue an alarm when the control unit has detected an abnormal value in output values from the plural detection portions.

As a result, if the structure is formed such that content of a control signal to switch the switch means off can be recorded and the content of control to switch the switch means off can be output, a portion that has encountered a fault can easily be detected. Thus, the portion can easily, quickly and accurately be repaired. The structure may be formed such that an indication of where electric power has been supplied can be recorded as well as recording the content of control to switch the switch means off. Moreover, the indication of where electric power has been supplied can be output if required so as to be advantageous when a vehicle is inspected, or maintenance of the same is performed. If an alarm is issued by displaying the content of the fault, by turning an alarm lamp on or issue a buzzer sound in a case where a fault, such as a short circuit, has taken place, a quick countermeasure can be taken against the generated fault.

Moreover, it is preferable that the electric power distribution system is formed by a wire harness to be mounted on a vehicle, the electric power distribution portions are formed by electric connection boxes, and the electric connection boxes are disposed adjacent to loads on the vehicle. It is preferable that the electric connection boxes are respectively connected to a variety of the loads.

As a result of the above-mentioned structure, the structure of the present invention can easily be adapted to systems to be mounted on a vehicle. Since the electric connection box is disposed near a position at which the loads for the vehicle are concentrated, the necessity of arranging the electric lines composed of a multiplicity of electric power supply lines for the various loads and the ground wire can be eliminated. Only a main trunk electric power line consisting of a pair of electric power supply lines and the ground wire is required.

BRIEF DESCRIPTION OF THE DRAWINGS

FIG. 5A is a schematic drawing of a car body showing a case where a trunk line 55 of a vehicle having the electric power distribution system according to this embodiment encountered a fault due to an impact caused from a traffic accident or the like.

DETAILED DESCRIPTION OF PREFERRED EMBODIMENTS

An embodiment of an electric power distribution system according to the present invention will now be described with reference to the drawings.

Figure 1A:
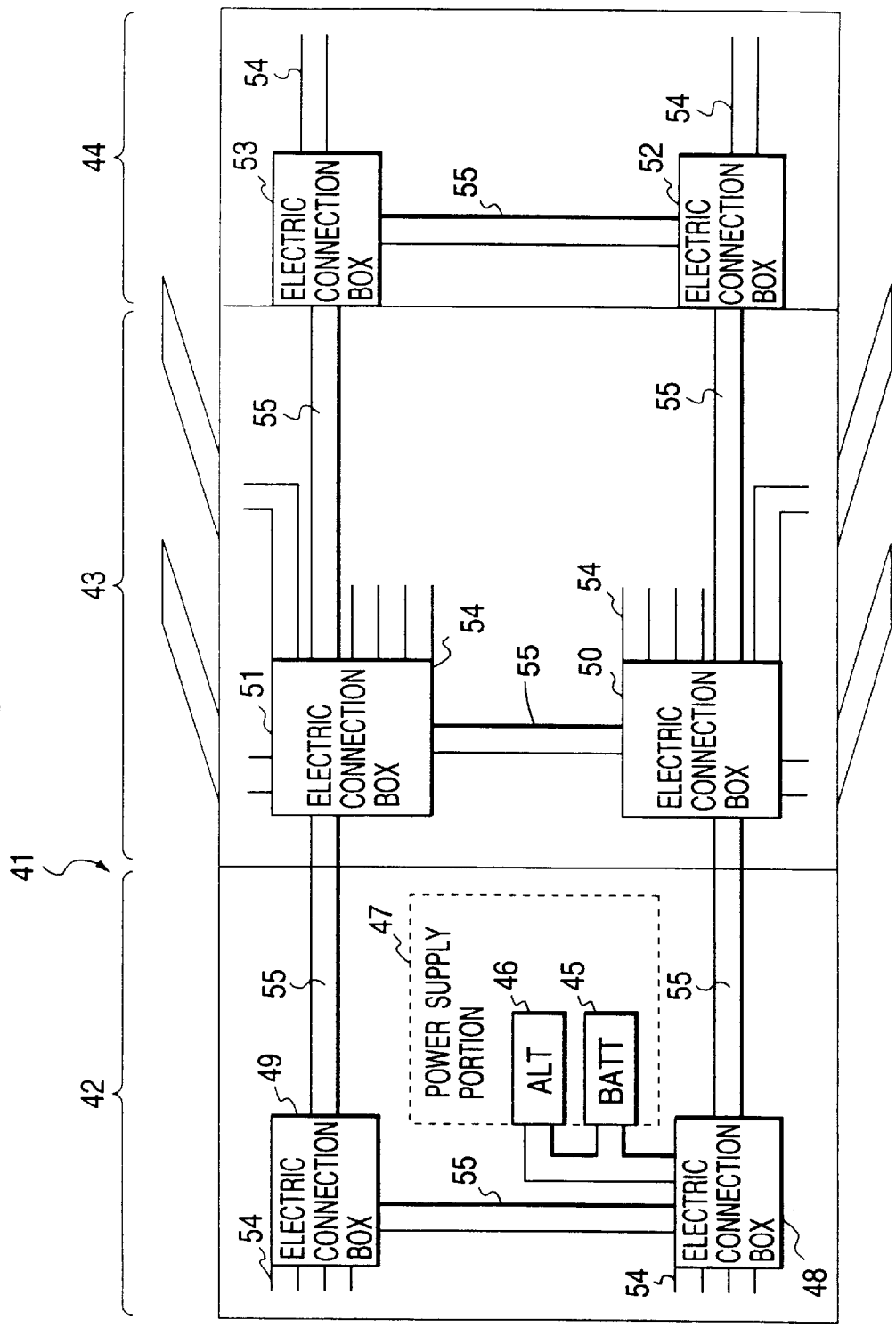
FIG. 1A is a schematic drawing of a car body showing the structure for supplying electric power by an electric power distribution system to be mounted on a vehicle according to an embodiment of the present invention.
Figure 1B:
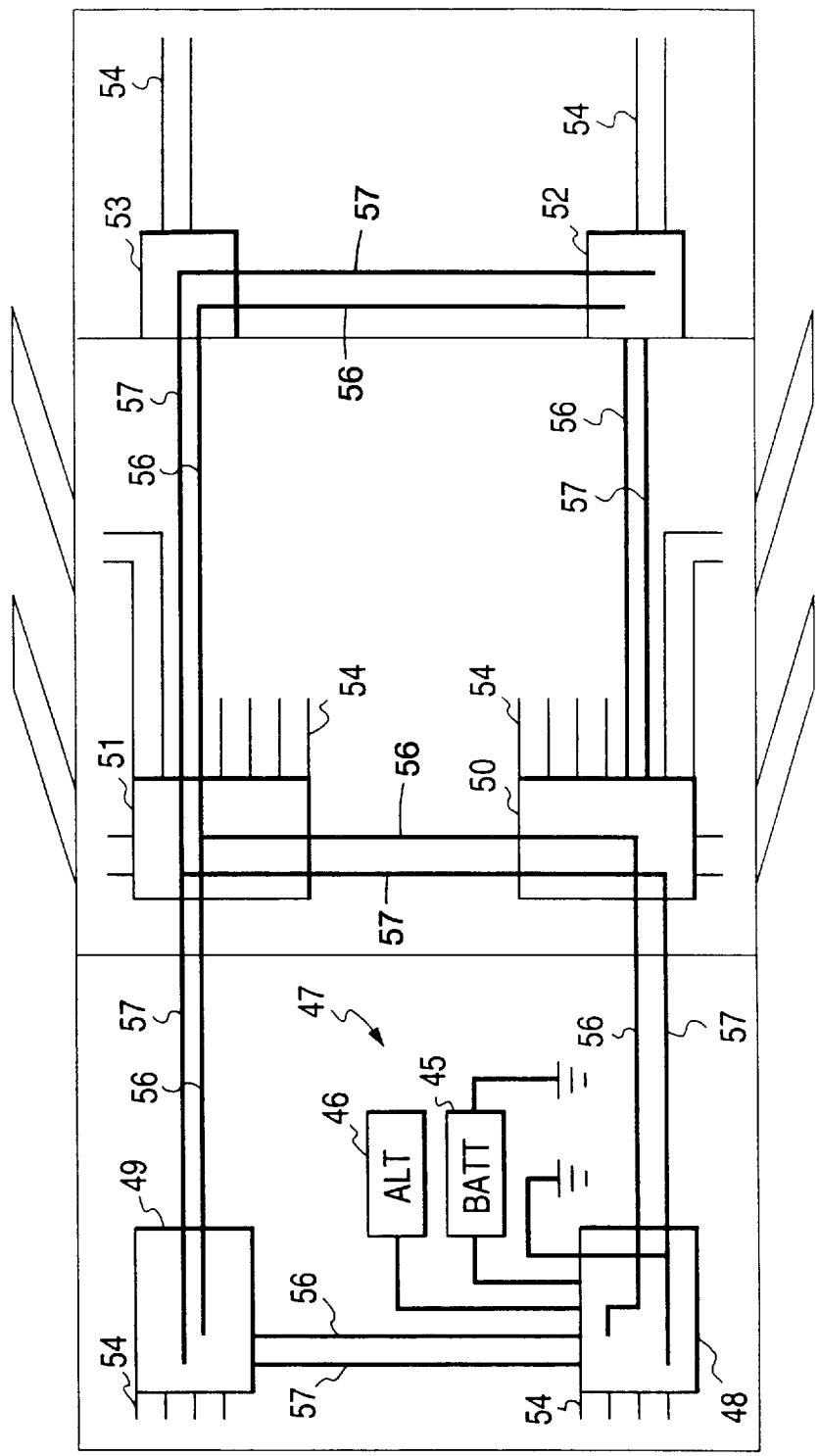
FIG. 1B is a diagram showing a structure in which the trunk line portions shown in FIG. 1(A) are expressed by power supply lines and ground wires.

FIGS. 1A and 1B are schematic drawings of a car body showing the structure for supplying electric power by an electric power distribution system to be mounted on a vehicle according to an embodiment of the present invention, wherein FIG. 1B is a diagram showing a structure in which the trunk line portions shown in FIG. 1A are expressed by power supply lines and ground wires.

Referring to FIGS. 1A and 1B, a car body 41 is sectioned into an engine room 42 formed in the front portion thereof and having, for example, an engine mounted thereon; a passenger space 43 formed in the rear of the engine room 42 and including a driver seat and a passenger seat; and a trunk room 44 formed in the rear of the passenger space 43.

In the engine room 42, there are formed a power supply portion 47 including a battery 45 and an alternator 46 for supplying electric power having predetermined voltage; electric connection boxes 48 and 49, which are junction boxes (J/B). A structure is formed such that the electric connection boxes 48 and 49 can be connected to each other by a trunk line 55. The power supply portion 47 can be connected to the electric connection box 48. The electric connection boxes 48 and 49 respectively are disposed in the front portions of the engine room 42 at two ends in the widthwise direction of the car body near various load electric parts such as right and left lamps. Thus, electric power supplied from the power supply portion 47 is distributed to the various load electric parts, such as head lamps and tail clearance lamps, through branch lines 54 consisting of electric-power supply lines and ground wires. In the passenger space 43, electric connection boxes 50 and 51, which are junction boxes (J/B), are disposed in the front portions of the passenger space 43 at two ends in the widthwise direction of the car body near the various load electric parts. The electric connection box 50 is connected to the electric connection boxes 48 and 51 through a trunk line 55. The electric connection box 51 can be connected to the electric connection box 49 through the trunk line 55. The electric connection boxes 50 and 51 further distribute electric power supplied from the electric connection boxes 48 and 49 to the various electric part loads through branch lines 54 consisting of the electric-power supply lines and ground wires, and are connected to various operation switches through switch signal lines.

Moreover, the trunk room 44 has electric connection boxes 52 and 53, which are junction boxes (J/B) that are disposed in front portions of the trunk room at two ends in the widthwise direction of the car body near the various load electric parts. The electric connection box 52 is connected through the trunk line 55 to the electric connection boxes 50 and 53. The electric connection box 53 is connected to the electric connection box 51 through the trunk line 55. The electric connection boxes 52 and 53 further distribute electric power supplied from the electric connection boxes 50 and 51 to various electric part loads, such as back lights, through branch lines 54 consisting of electric-power supply lines and ground wires. As described above, the electric connection boxes 48 to 53 serve as the electric power distribution portions for distributing electric power to the plurality of the various loads. The electric connection boxes are disposed in the portions in which the loads are concentrated. The electric connection box 48 is supplied with electric power from the power supply portion 47, and the electric connection boxes 49 to 53 are able to supply electric power from the electric connection box 48 through at least two systems of trunk lines 55. That is, as shown in FIG. 1B, one electric power supply passage permits electric power to be supplied from the power supply portion 47 to the electric connection box 48, the electric connection box 50 and the electric connection box 51. Then, electric power is supplied from the electric connection box 51 to the electric connection boxes 49 and 53. Then, electric power is supplied from the electric connection box 53 to the electric connection box 52. Even if a short circuit takes place in one trunk line 55, disconnection of the trunk line 55 encountering the short circuit enables electric power to be supplied through the other trunk line 55. Thus, the electric power supply passage is switched from that shown in FIG. 1B to the other electric power supply passage so that supply of electric power is performed. The trunk line 55 has a multiplex communication line in addition to the electric-power supply line 56 and the ground line 57. One electric-power supply line 56 and one ground line 57 are employed so that two lines are provided.

Figure 2:
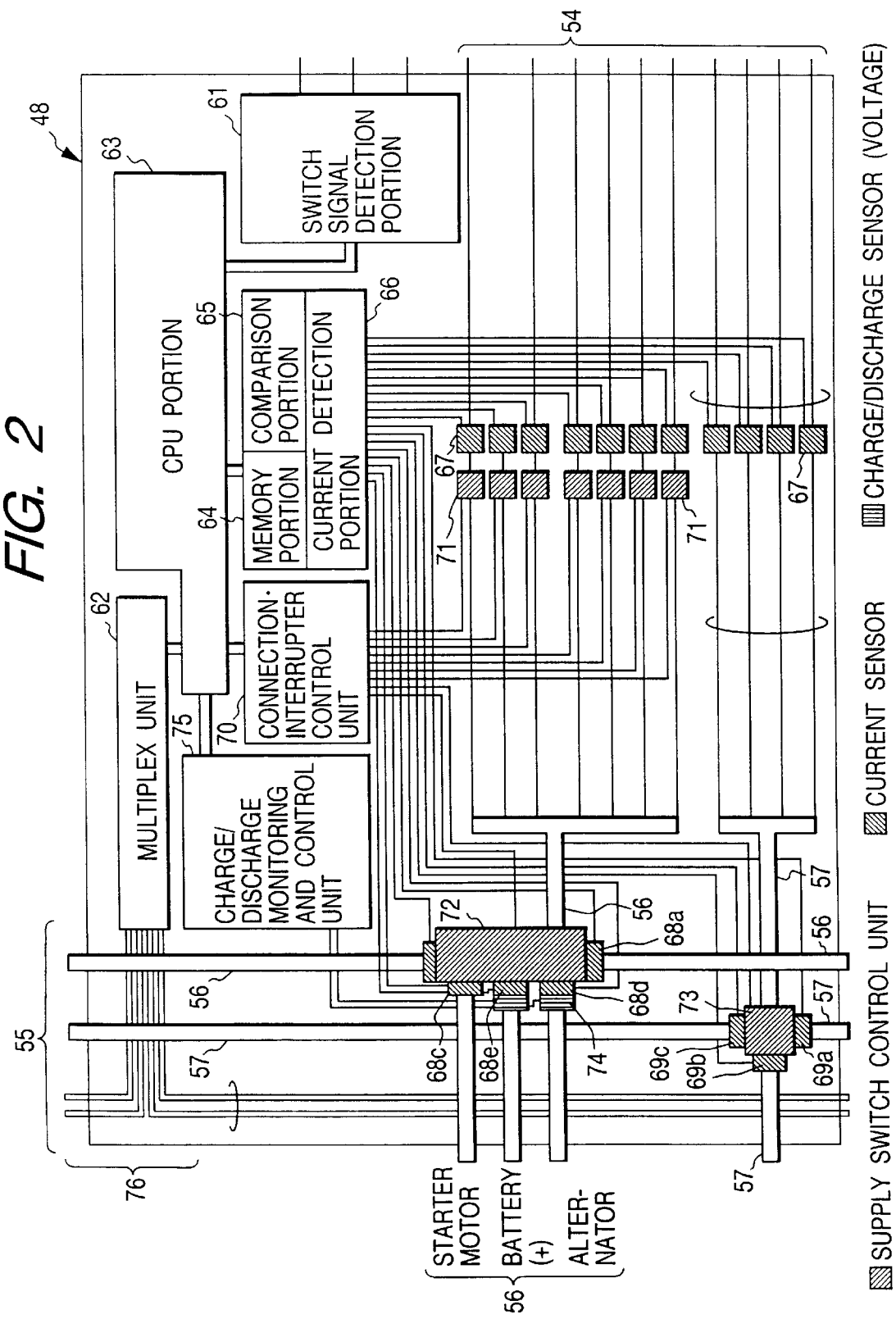
FIG. 2 is a block diagram showing the structure of the electric connection box 48 shown in FIGS. 1A and 1B.
Figure 3:
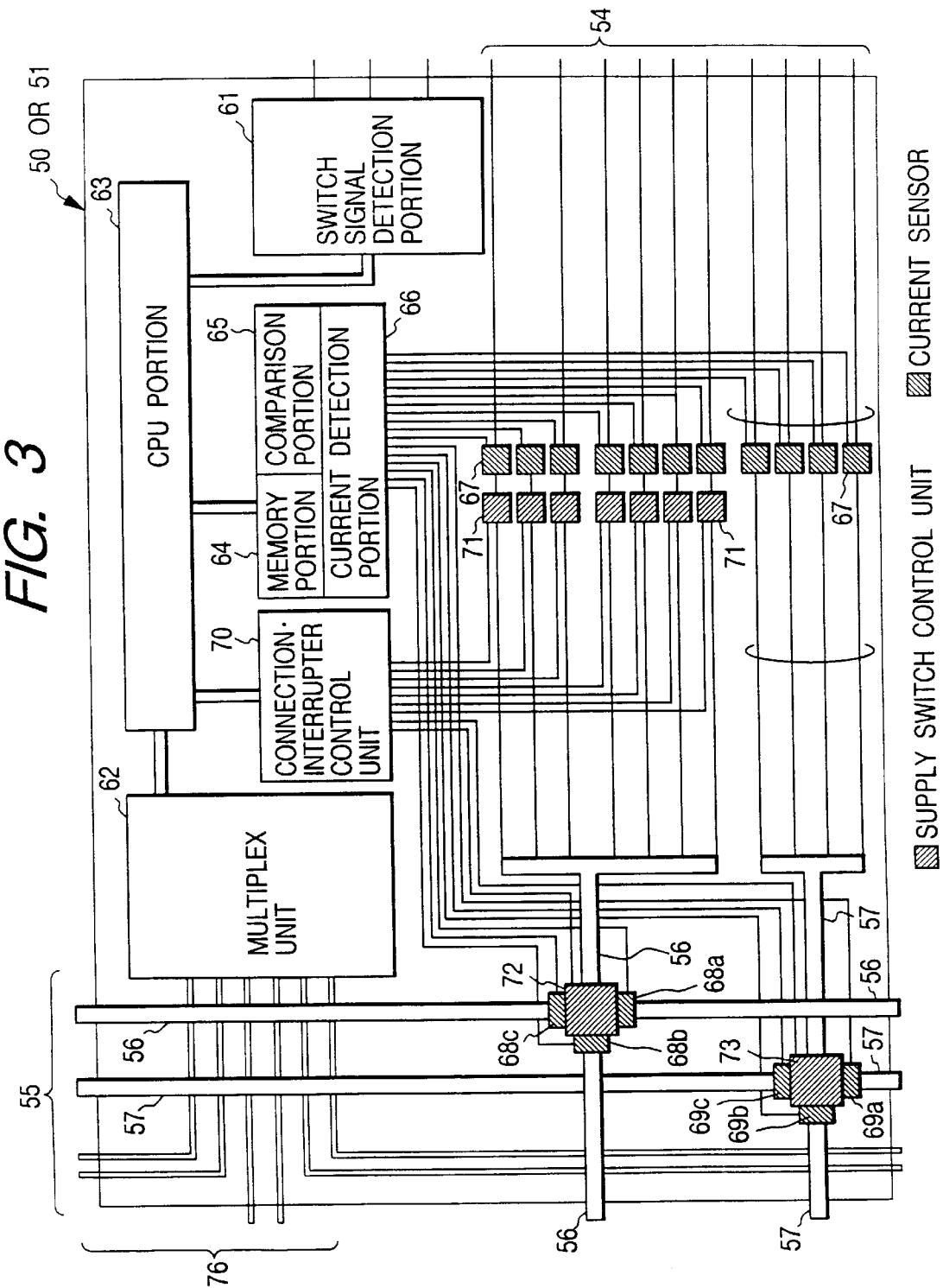
FIG. 3 is a block diagram showing the structures of the electric connection boxes 50 and 51 shown in FIGS. 1A and 1B.

FIG. 2 is a block diagram showing the structure of the electric connection box 48. FIG. 3 is a block diagram showing the structures of the electric connection boxes 50 and 51 shown in FIG. 1. The electric connection boxes 49, 52 and 53 shown in FIG. 1 are different from the electric connection boxes 50 and 51 shown in FIG. 3, which are capable of supplying electric power through three systems of the trunk lines 55, in that the electric connection boxes 49, 52 and 53 shown in FIG. 1 are able to supply electric power through two systems of the trunk lines 55. The other essential portions are formed similarly.

Referring to FIGS. 2 and 3, each of the electric connection boxes 48 to 53 is provided with a switch-signal detection portion 61 for detecting a state of switching of the operation switch for each system; a multiplex unit 62 for transmitting/receiving data of the state of switching of the operation switch detected by the switch-signal detection portion 61; and a control unit 63 disposed between the switch-signal detection portion 61 and the multiplex unit 62 and comprising a central processing unit (CPU).

The switch-signal detection portion 61, disposed in the electric connection box nearest the switch unit, detects a switch signal supplied from the switch unit. In response to the detected switch signal, supply of electric power to the load corresponding to the detected switch signal is (controlled in the electric connection box near the required load) through the multiplex unit 62.

The multiplex unit 62 transmits/receives various detection data between electric connection boxes by multiplex communication method. For example, it receives, through the control unit 63, various data, such as an accessory mode signal, an ignition mode signal and switch signals for the various loads detected by the switch-signal detection portion 61 to multiplex-transmit the data through a multiplex communication line 76 which is an external network. As an alternative to this, it receives control signal data above, which has been multiplex-transmitted and then outputs a control signal to the connection/disconnection control unit 70 through the control unit 63. If the control signal is a switch signal, it controls to make electrically conductive the supply switch control unit 71 corresponding to the received switch signal. At this time, the various loads do not correspond to the switch signals of the operation switches. The operations of some loads are determined by combination of two or more signals.

Each of the electric connection boxes 48 to 53 is provided with a memory portion 64 and a comparison portion 65 connected to the control unit 63, a current detection portion 66 connected to the comparison portion 65, a current sensor 67 connected to the current detection portion 66 and comprising a current transformer (CT) for detecting the level of an electric current allowed to flow in the electric-power supply line which is the branch line 54 connected to a particular load, current sensors 68a to 68e connected to the current detection portion 66 and comprising a current transformer (CT) for detecting the level of an electric current allowed to flow in each branched portion of the electric-power supply line 56 of the trunk line 55; and current sensors 69a to 69c comprising a current transformer (CT) for detecting the level of an electric current allowed to flow in each branched portion of the ground line 57 of the trunk line 55. Moreover, each of the electric connection boxes 48 to 53 is provided with a connection/disconnection control unit 70 connected to the control unit 63, a supply switch control unit 71 connected to the connection/disconnection control unit 70 comprises a semiconductor switch, such as a transistor for electric power arranged to permit/interrupt supply of an electric current to the electric-power supply line serving as the branch line 54 connected to each of the various loads; a supply switch control unit 72 connected to the connection/disconnection control unit 70 comprises a semiconductor switch, such as a transistor for electric power arranged to permit/interrupt supply of an electric current to each branched portion of the electric-power supply line 56 of the trunk line 55; a supply switch control unit 73 connected to the connection/disconnection control unit 70 comprises a semiconductor switch, such as a transistor for electric power arranged to permit/interrupt supply of an electric current to the ground line 57 of the trunk line 55; and a charge/discharge monitoring/control unit 75 connected to the control unit 63 and a charge/discharge sensor 74.

The memory portion 64 previously stores an electric current level for each load when the load is operated normally. Position information indicating the content of switched-off control realized such that the supply switch control units 71 to 73 have interrupted supply of electric power due to generation of a fault, such as a short circuit, is stored in the memory portion 64 of the electric connection box relating to the foregoing position. When the vehicle is repaired, information of the position which has encountered the fault, such as the short circuit, can be output from the memory portion 64.

The comparison portion 65 outputs an abnormal signal if the compared values are different from each other, and diagnoses whether the wire harness is normal in accordance with the level of the electric current detected by the current sensors 67 to 69 and the detection portion of the current detection portion 66. For example, in a region from the inside portion of the electric connection box to the various loads, the detected level of the electric current allowed to flow in each load and data value stored in the memory portion 64 are subjected to a comparison. Moreover, the level of the electric current in the power supply portion to each load and that from the load to the ground are subjected to a comparison. In a region from the power supply portion 47 to the electric connection box 48 and in the trunk line 55 between the electric connection boxes, the amount of electric power supplied to all of the connected loads, the amount of electric power supplied to another electric connection box and the amount of electric power supplied from the other electric connection box are subjected to a comparison. Moreover, the amount of electric power supplied to the ground wire from the other electric connection box, the amount of electric power supplied from all of the loads connected to the electric connection box to the ground wires and the amount of the electric power to all of the ground wires from the other electric connection box are subjected to a comparison. The foregoing comparisons are performed to determine whether the state is normal in accordance with whether the values coincide with one another.

The supply switch control unit 71 is controlled in a normal state to electrically conduct or to supply electric power to the load corresponding to the switch signal. In an abnormal state, it is controlled to interrupt supply of electric power. The supply switch control unit 72 controls to turn on/off the electric-power supply lines 56 between the power supply portion 47 and the electric connection box 48 and between the electric connection boxes. The supply switch control unit 73 controls to turn on/off the ground line 57 between the power supply portion 47 and the electric connection box 48 and between the electric connection boxes. In a normal state, the switch is able to always permit supply of electric power. In an abnormal state, it is structured to interrupt supply of electric power to only the abnormal trunk line 55. The supply switch control units 71 to 73 can be formed as semiconductor switches, such as a field effect transistor, a transistor for electric power, another electronic switch or a relay.

The comparison portion 65 is connected to the current detection portion 66, which is connected to the current sensor 67. The comparison portion 65 is also connected to the supply switch control unit 71 through the control unit 63, to which the memory portion 64 is connected, and through the connection/disconnection control unit 70. The electric current level detected by the current sensor 67 and normal electric current level stored in the memory portion 64 and set to the load are subjected to a comparison in the comparison portion 65. If the two current levels do not coincide with each other, an abnormal signal is, as comparison result information, output to the control unit 63. If the two levels coincide with each other, a normal signal is, as comparison result information, output to the control unit 63. In accordance with the comparison result information, the control unit 63 outputs a control signal to the connection/disconnection control unit 70. In response to the control signal, the connection/disconnection control unit 70 controls the supply switch control unit 71 to be electrically conducted or made to be non-conductive (controlled to be switched on/off).

The current detection portion 66 is connected to the current sensors 68a to 68e and 69a to 69c. The comparison portion 65 is connected to current detection portion 66, and is connected, is connected to supply switch control units 72 and 73 through the control unit 63. Control unit 63 is also connected to the switch-signal detection portion 61, the memory portion 64, and the connection/disconnection control unit 70. Electric current levels detected by the current sensors 68a to 68e and 69a to 69c, and the electric current level corresponding to the state of switching of the operation switch, stored in the memory portion 64 and set to the trunk line 55, are subjected to a comparison in the comparison portion 65. If the levels do not coincide with each other, an abnormal signal is, as comparison result information, output to the control unit 63. If the levels coincide with each other, a normal signal is, as comparison result information, output to the control unit 63. In accordance with comparison result information, the control unit 63 controls the supply switch control units 72 and 73 to be electrically conducted or made to be non-conductive (controlled to be switched on/off) through the connection/disconnection control unit 70.

The operation of the foregoing structure will now be described. In order to simplify the description, the operation of the electric connection box 50 will now be described together with the operation of the electric connection box 48.

Figure 4:
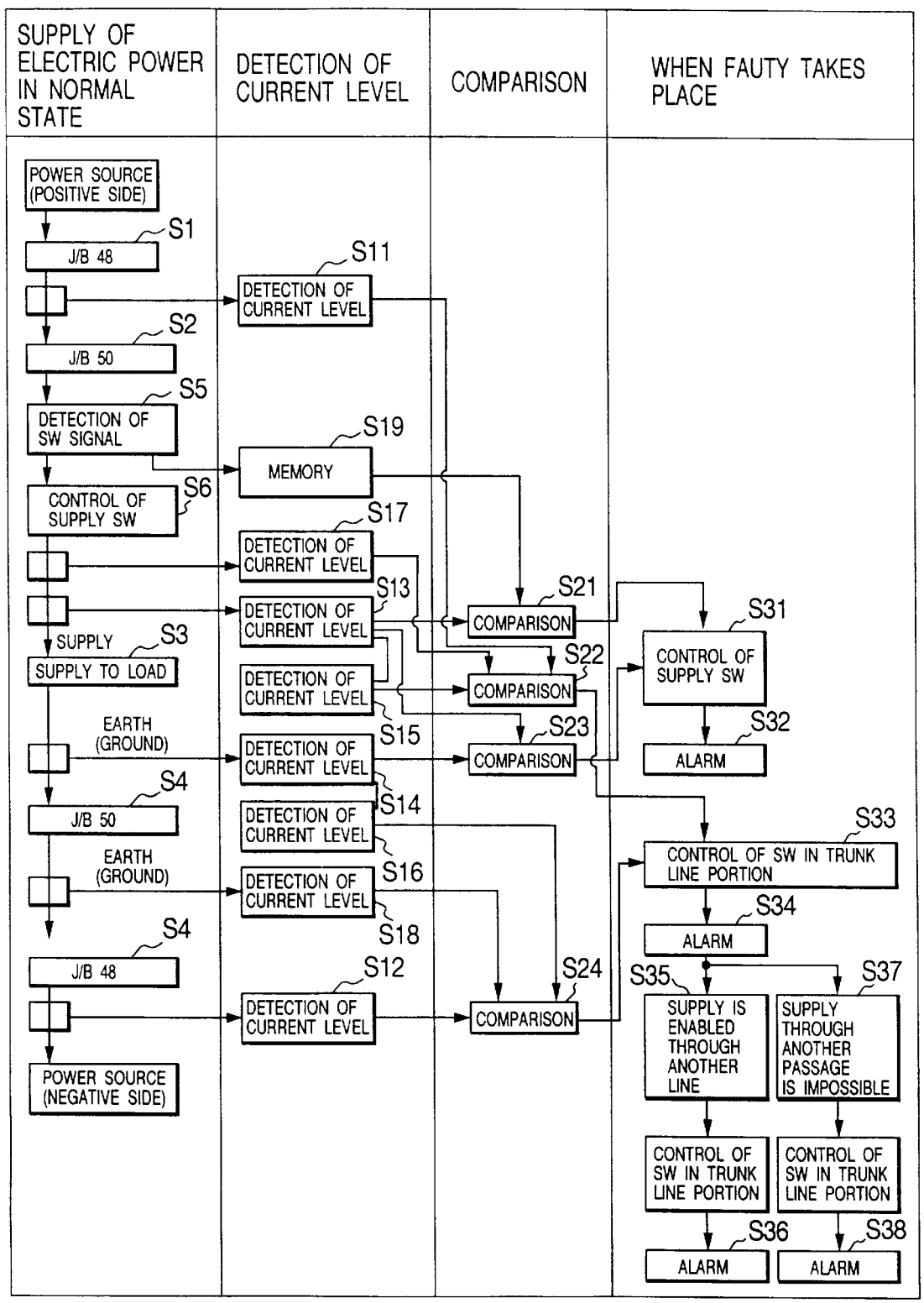
FIG. 4 is an operation flow chart for explaining the operations of the electric connection box 48 shown in FIG. 2 and the electric connection box 50 shown in FIG. 3.

FIG. 4 is an operation flow chart for explaining the operation of the electric connection box 50 shown in FIG. 3 together with the operation of the electric connection box 48.

As shown in FIG. 4, when electric power is supplied in a normal state (S1 to S6), an electric current level in the trunk line portion and each load is detected (S11 to S19). The results of detected electric current levels are compared to monitor the electric current level (S21 to S24) so as to inhibit (S31 to S38) supply to the trunk line portion or the load encountering a fault, such as a short circuit. As a result, even if supply of electric power by the protective circuit, the other normal electric part system can be made to be operable. The operation will now be described further in detail.

Referring to FIGS. 1 to 4, when electric power is supplied in a normal state (S1 to S6), the electric connection box 48, which is a junction box (J/B), is supplied with electric power from the power supply portion 47 (S1). Then, electric power is supplied from the electric connection box 48 to the electric connection box so, which is also a junction box (J/B), through the trunk line 55 (S2). The electric connection boxes 48 and 50 distribute electric power to various loads through the electric-power supply line 56 of the trunk line 55 and the electric-power supply lines serving as the branch lines 54 (S3). Then, electric power distributed and supplied by the electric connection boxes 48 and 50 to the various loads is used to operate the loads. Then, electric power is unified in the ground line 57 of the trunk line 55 through the ground wires serving as the branch lines 54 (S4).

At this time, the switch-signal detection portion 61 of each of the electric connection boxes 48 and 50 detects switch information. Moreover, it detects a switch signal indicating the state of switching of the operation switch in accordance with switch information transmitted from other electric connection boxes by the multiplex communication (S5). Moreover, the control unit 63 performs supply switch control to make conductive or non-conductive the supply switch control unit 71 for the load corresponding to the switch signal through the connection/disconnection control unit 70. Then, the detected switch signal is multiplex-transmitted to a multiplex communication line 76, which is the external network, through the control unit 63 and the multiplex unit 62. As an alternative to this, after the multiplex-transmitted switch signal has been received, a control signal is output to the connection/disconnection control unit 70 through the control unit 63 to perform supply switch control to make conductive or non-conductive the supply switch control unit 71 for the load corresponding to the received switch signal (S6). As described above, in accordance with detection of the switch signal (S5), the supply switch control (S6) is performed so that the vehicle is driven in a required switch state.

When an electric current in the trunk line portion and each load is detected (S11 to S19), the current sensors 67 for the electric-power supply lines serving as the branch lines 54 for each load, in the electric connection box 48, detect the amount of supplied electric current for each load. Moreover, each current sensor 67 detects the amount of the ground current for each of the various loads in each of the ground wires and detects the total amount of the supplied electric current and the total amount of the grounded electric current in the electric connection box 48. Each of the current sensors 68a and 68b detects the amount of supplied electric current in each of the trunk line portions at each of the branched portions of the electric-power supply line 56 of the trunk line 55 from the electric connection box 48 to the electric connection boxes 49 and 50. Moreover, each of the current sensors 69a to 69c detects the amount of ground electric current in each trunk line portion at each branched portion of the ground line 57 of the trunk line 55 from the inside portions of the electric connection boxes 49 and 50. Referring to FIG. 4, the current sensor 68a at the branched portion of the electric-power supply line 56 of the trunk line 55 from the electric connection box 48 to electric connection box 50 detects the amount of the electric current for each trunk line portion in step S11. In step S12, the current sensor 69a at the branched portion of the ground line 57 of the electric connection box 48 returned from the electric connection box 50 detects the amount of ground electric current for each trunk line portion.

In the electric connection box 50, the current sensor 67 for the electric-power supply line serving as the branch lines 54 for each of the various loads detects the amount of each of supplied electric currents for each of the various loads (S13). Moreover, the current sensor 67 for the ground wire serving as the branch lines 54 from each of the various loads detects the amount of each of the ground electric currents for each of the various loads (S14). In addition, the amounts of the electric currents supplied to the various loads are added to detect the overall amount of the supplied electric currents in the electric connection box 50 (S15). Moreover, the amounts of ground electric currents for the respective various loads are added to detect the overall ground electric currents (S16). Moreover, each of the current sensors 68a to 68c detects the amount of the electric current supplied to each trunk line portion at each branched portion of the electric-power supply line 56 of the trunk lines 55 from the electric connection box 50 to the electric connection boxes 48, 51 and 52 (S17). In addition, each of the current sensors 68a to 68c detects the amount of the electric current in each trunk line portion at each branched portion of the ground line 57 of the trunk lines 55 from the electric connection box 50 to the electric connection boxes 48, 51 and 52 (S18).

Moreover, in the electric connection boxes 48 and 50, the electric-power supply line 56 is able to previously obtain, from normal-state data value for each load stored in the memory portion 64, the level of the electric current required for each load in a state of switching denoted by a switch signal detected by the switch-signal detection portion 61 (S19).

When the level of the electric current is monitored by comparing the results of the detected electric current levels (S21 to S24), the current detection portion 66 detects the amount of the electric current supplied to each of the various loads in accordance with present data obtained from each of the current sensors 67 as described above. Then, the present amount of the electric current supplied to each load and the level of the electric current to be supplied to each load stored in the memory portion 64 in a normal state are compared to detect whether the levels coincide or do not coincide with each other (S21) so as to monitor the level of the electric current for each load. In accordance with data obtained from the current sensor 68a of the electric connection box 48 for the branched portion of the trunk line connected to the electric connection box 50 and data obtained from each of the current sensors 68b and 68c of the electric connection box 50, the current detection portion 66 of the electric connection box 50 detects the amount of the electric current supplied to each trunk line portion at each branched portion of the trunk line 55. The amount of the electric currents supplied to all of the trunk line portions at each of the branched portion and the total amount of electric currents supplied to the various loads are compared with each other by the comparison portion 65 to detect whether the amounts coincide or do not coincide with each other (S22). Thus, the level of the electric current in the electric-power supply line 56 between the electric connection boxes 48 and 50 and that between each branched portion of the electric-power supply line 56 and the distribution portion from which the electric current is distributed to the various loads, are monitored. At this time, the amount of electric power allowed to flow into the branched point of the electric-power supply line 56 of the electric connection box 50 and that allowed to flow out from the branched point are the same. Therefore, flow-in side data is given a positive sign and flow-out side data is given a negative sign to compare the coincidence or non-coincidence of the positive sign and the negative sign. If a result of monitoring of the electric current level for each electric-power supply line 56 is determined to be abnormal, the current detection portion 66 detects the amount of the electric current supplied to the trunk line portion at each of the branched portions of the electric-power supply line 56 in accordance with data obtained from the current sensors 68a and 68a disposed at the two ends of the electric-power supply line 56 between the electric connection box 48 and 50. The amounts of the electric currents supplied to each trunk line portion at the two ends of the trunk line 55 are compared to detect whether the amounts coincide so that it can be determined whether the electric-power supply line 56 between the electric connection boxes 48 and 50 has a fault, such as a short circuit. In accordance with data obtained from the current sensors 68a to 68c of the electric connection box 50, the current detection portion 66 of the electric connection box 50 detects the amount of the electric current supplied to the trunk line portion at each branched portion of the electric-power supply line 56. The amount of the electric currents supplied to all of the trunk line portions at each branched portion and the total amount of the electric currents supplied to the various loads are compared to detect whether the amounts coincide with each other. Thus, whether a fault takes place between each branched portion of the electric-power supply line 56 and the distribution portion from which the electric current is distributed to the various loads can be determined. Thus, the abnormal portion can be detected and specified.

Also on the ground side, in the electric connection boxes 48 and 50, the current detection portion 66 detects the amount of ground electric current for each of the various loads in accordance with current data obtained by each of the current sensor 67 on the ground side. The current amount of the ground electric current and the amount of the electric current for each of the various loads detected in step S13 are compared with each other in the comparison portion 65 to detect whether the amounts coincide (S23) so that the level of the electric line for each of the various loads is monitored. Data obtained by the current sensor 69a disposed at the branched portion of the ground line 57 from the electric connection box 50 adjacent to the electric connection box 48 and data obtained by the current sensors 69b and 69c provided in the branched portions of the ground line 57 adjacent to the electric connection box 50 are used by the current detection portion 66 to detects the amount of the ground electric current for the trunk line portion at each of the branched portions of the trunk line 55. The amount of the ground electric current for all of the trunk line portions at each of the branched portions and the total amount of the ground electric current for each of the various loads are compared with each other by the comparison portion 65 to detect whether the amounts coincide (S24). Thus, the level of the electric current in each of the ground lines 57 of the trunk line 55 between the electric connection boxes 48 and 50 and the unified portion of the various loads and each branched portion of the ground line 57 of the trunk line 55 is monitored. At this time, the amount of electric power allowed to flow in the branched point of the ground line 57 adjacent to the electric connection box 50 and that allowed to flow out from the branched point is same. Therefore, electric current flow-in side data is given a positive sign and electric current flow-out sides data is given a negative sign. Thus, whether the signs coincide with each other can be compared. If a result of monitoring of the electric current for each ground line 57 is determined to be abnormal, data obtained by the current sensors 69*a* and 69*a* at the two ends of the ground line 57 is used by the current detection portion 66 to detect the amount of the trunk line ground electric current in the ground line 57. The amounts of the trunk line ground electric currents at the two ends of the ground line 57 are compared with each other by the comparison portion 65 to detect whether the amounts coincide with each other. Thus, whether the ground line 57 between the electric connection boxes 48 and 50 has a fault can be determined. Data obtained from the current sensors 68*a* to 68*c* of the electric connection box 50 is used by the current detection portion 66 of the electric connection box 50 to detect the amount of the trunk line ground electric current for each branched portion of the ground line 57. The total amount of the trunk line ground electric current at the branched portions and the total amount of the ground electric currents returned from the various loads for each electric connection box 50 are compared with each other by the comparison portion 65 to detect whether the amounts coincide with each other. Thus, whether the level of the electric current in the unified portion of the various loads and each branched portion of the ground line 57 of the trunk line 55 has a fault can be determined. Thus, the abnormal portion can be detected and specified.

In a case where only a load encountering a fault or only an electric-power supply line connected to the fault load is disconnected (S31, S32) if a fault, such as a short circuit, takes place, for example, if an electric-power supply line connected to any one of the various loads encounter a short circuit due to aging or the like, an excess current flow in the electric-power supply line encounters the short circuit. Each of the current sensor 67 of the electric connection box 50 corresponding to the load detects the high electric current level. If a non-coincidence result is obtained in S21 or S23, the electric-power supply line 56 controls the supply switch control unit 71 adjacent to the current sensor 67 to disconnect the short-circuit portion through the connection/ disconnection control unit 70. As a result, only the short-circuited load or only the electric-power supply line connected to the load can be disconnected (S31). Moreover, the position of the trunk line portion encountering the fault is displayed with the alarm lamp or the alarm buzzer to issue an alarm to the driver (S32).

Figure 5A:
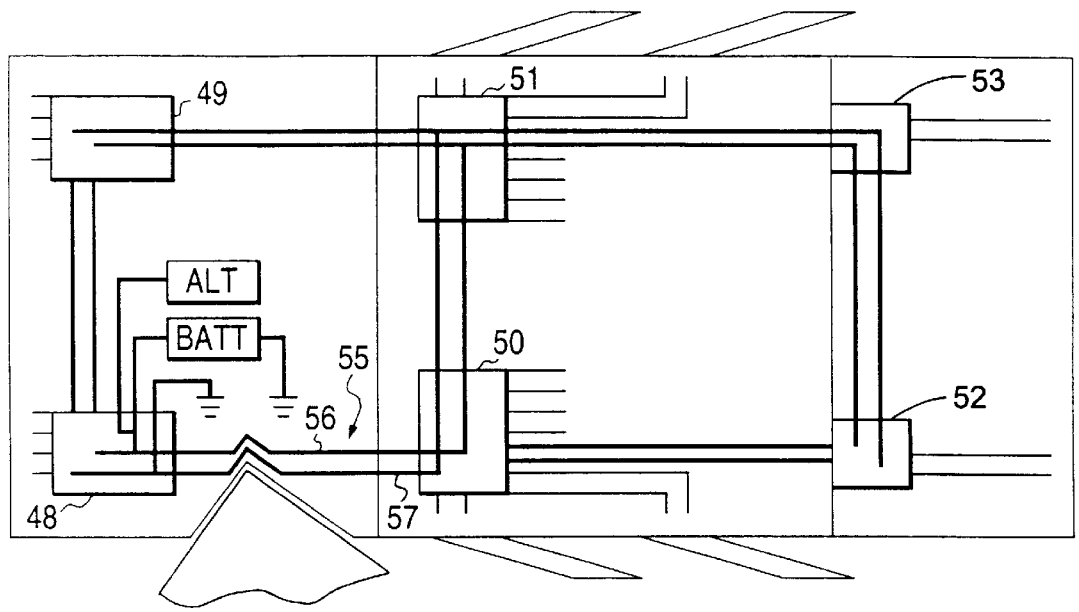
Figure 5B:
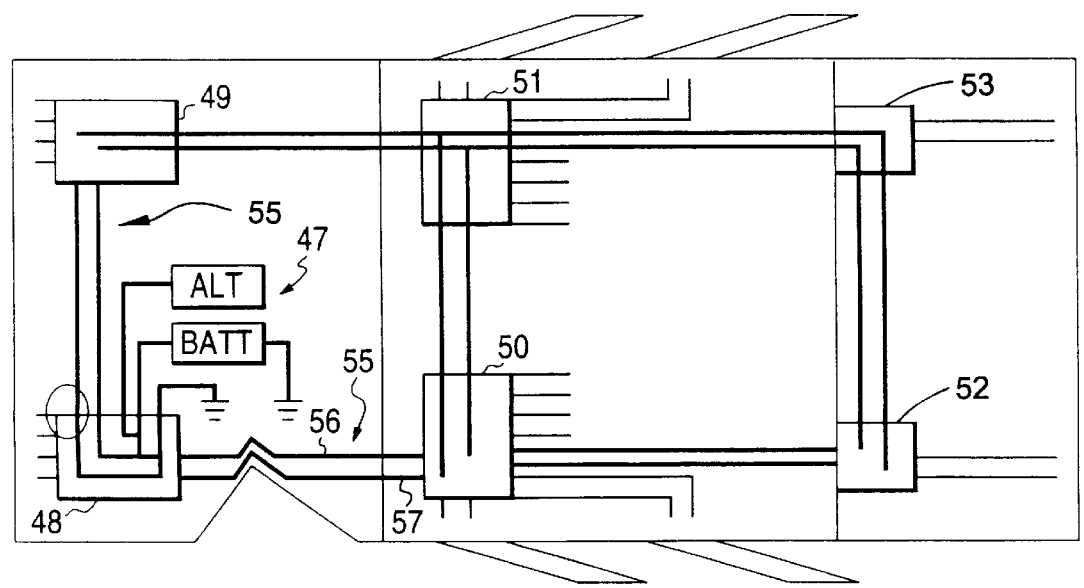
FIG. 5B is a schematic drawing showing the routing of electric power to electric connection box 49 from electric connection box 48 after the occurrence of a fault in FIG. 5A.
Figure 6:
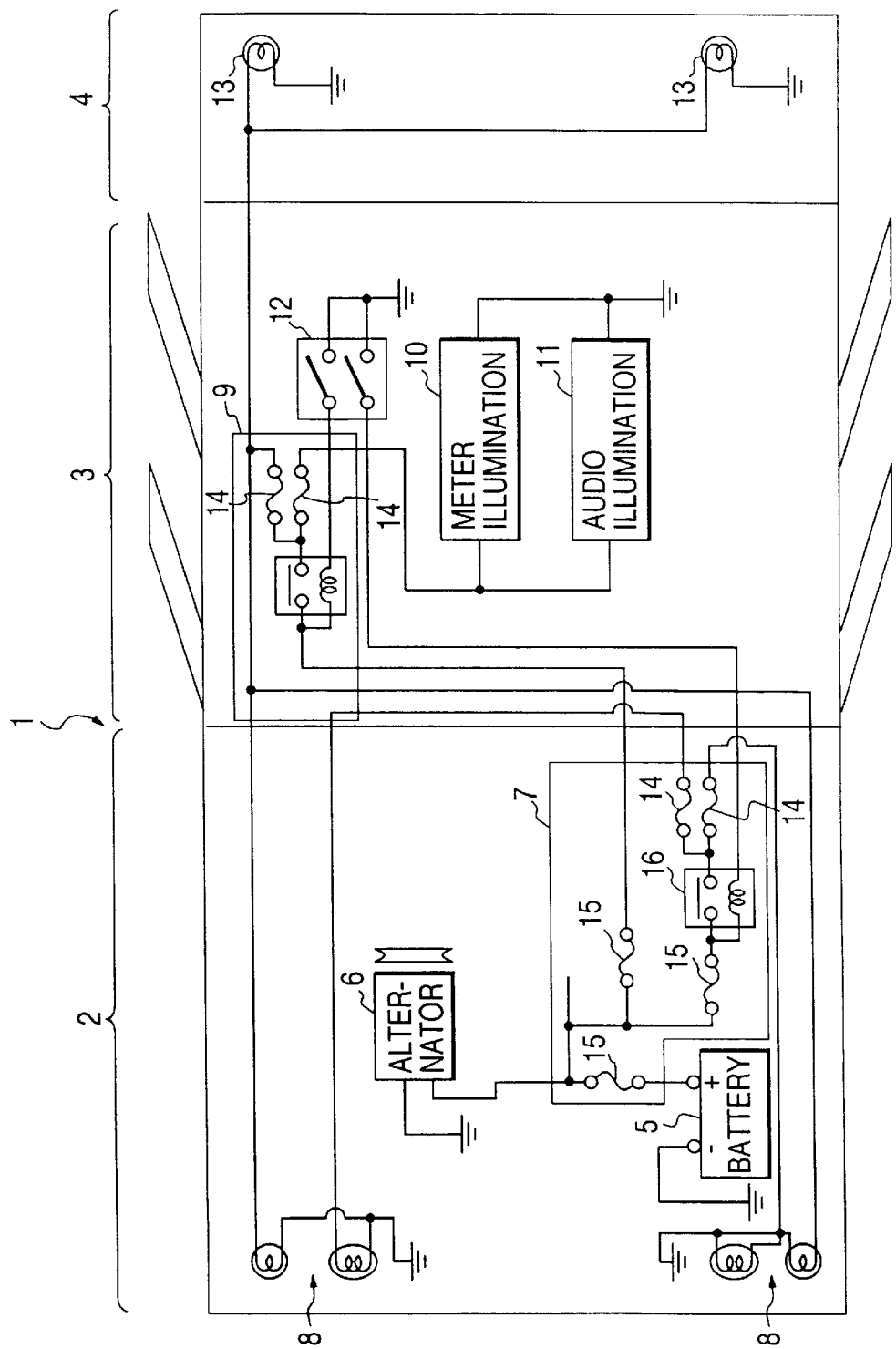
FIG. 6 is a schematic drawing of a car body showing an electric power supply structure of the conventional electric power distribution system to be mounted on a vehicle.
Figure 7:
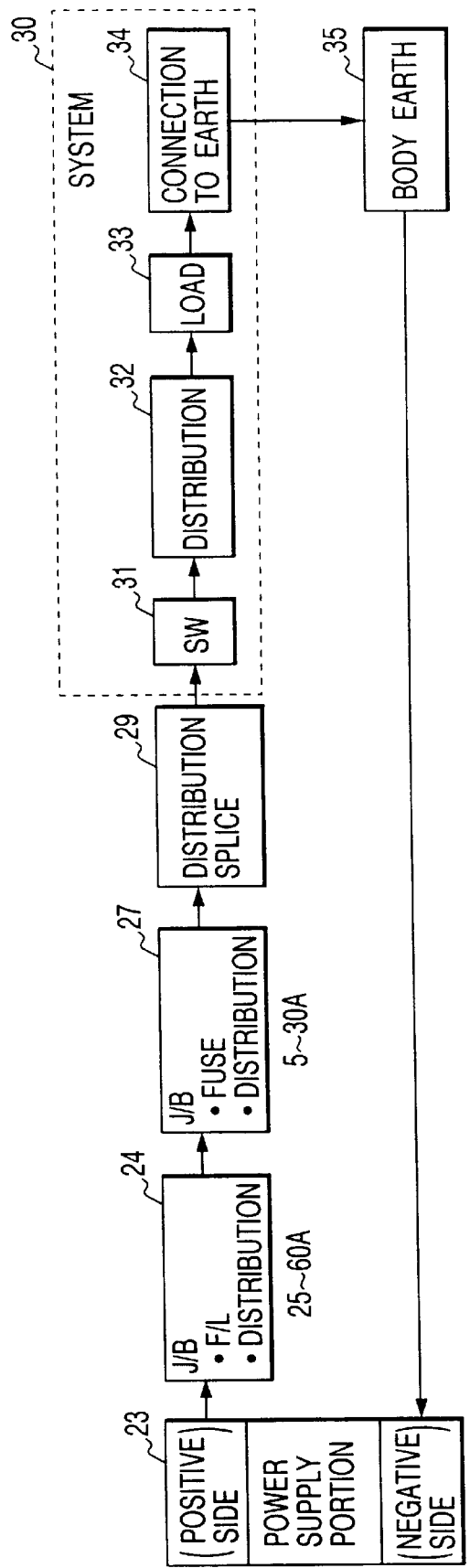
FIG. 7 is a block diagram showing the structure of the conventional electric power distribution system.
Figure 8:
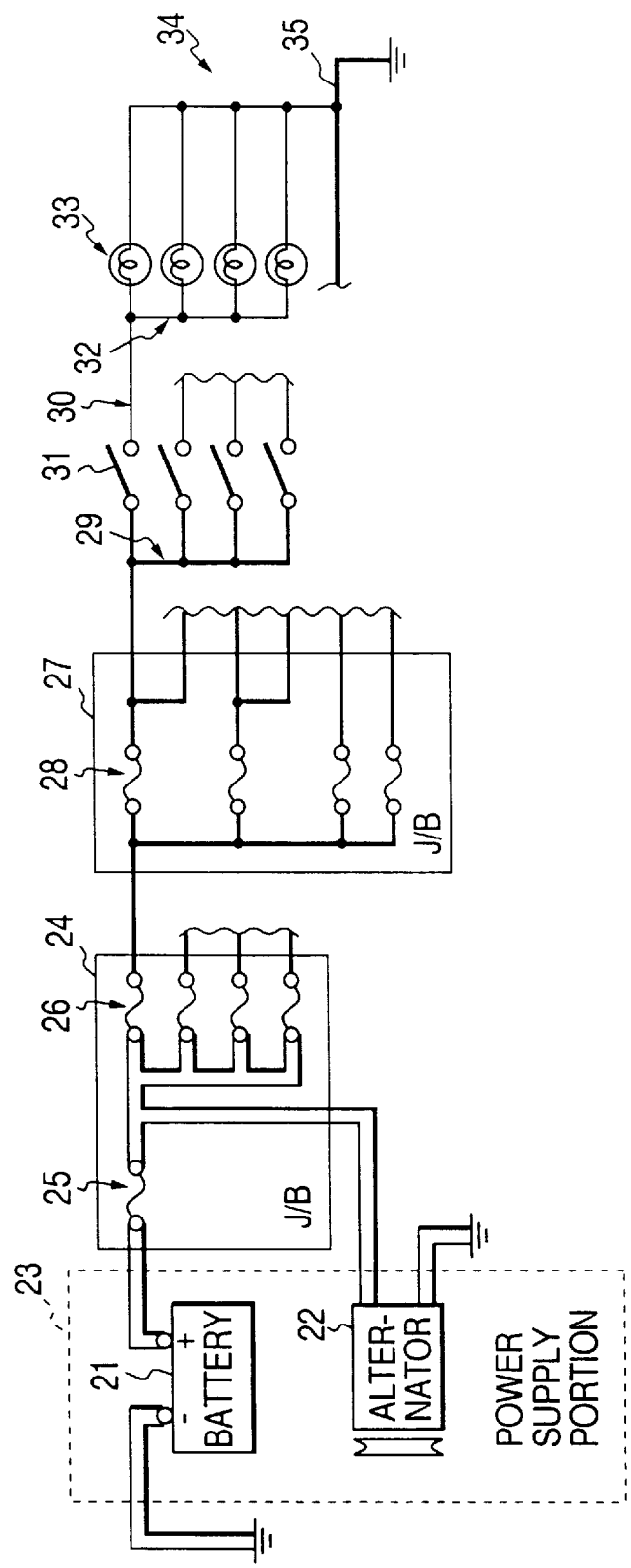
FIG. 8 is a circuit diagram showing an essential portion of the electric power distribution system shown in FIG. 8.
Figure 9:
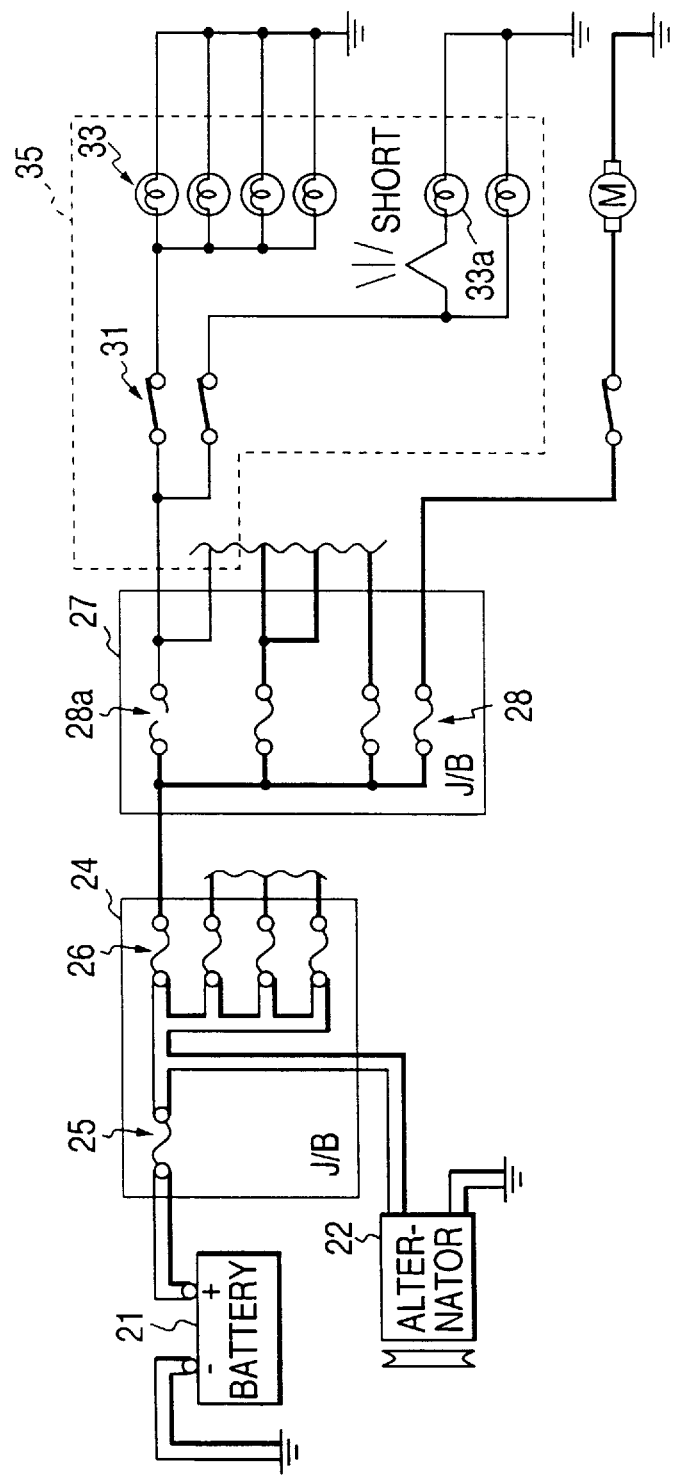
FIG. 9 is an illustration showing a problem in a case where a short circuit has taken place in an electric-power supply line connected to a lamp 33a which is an electric part load.
Figure 10:
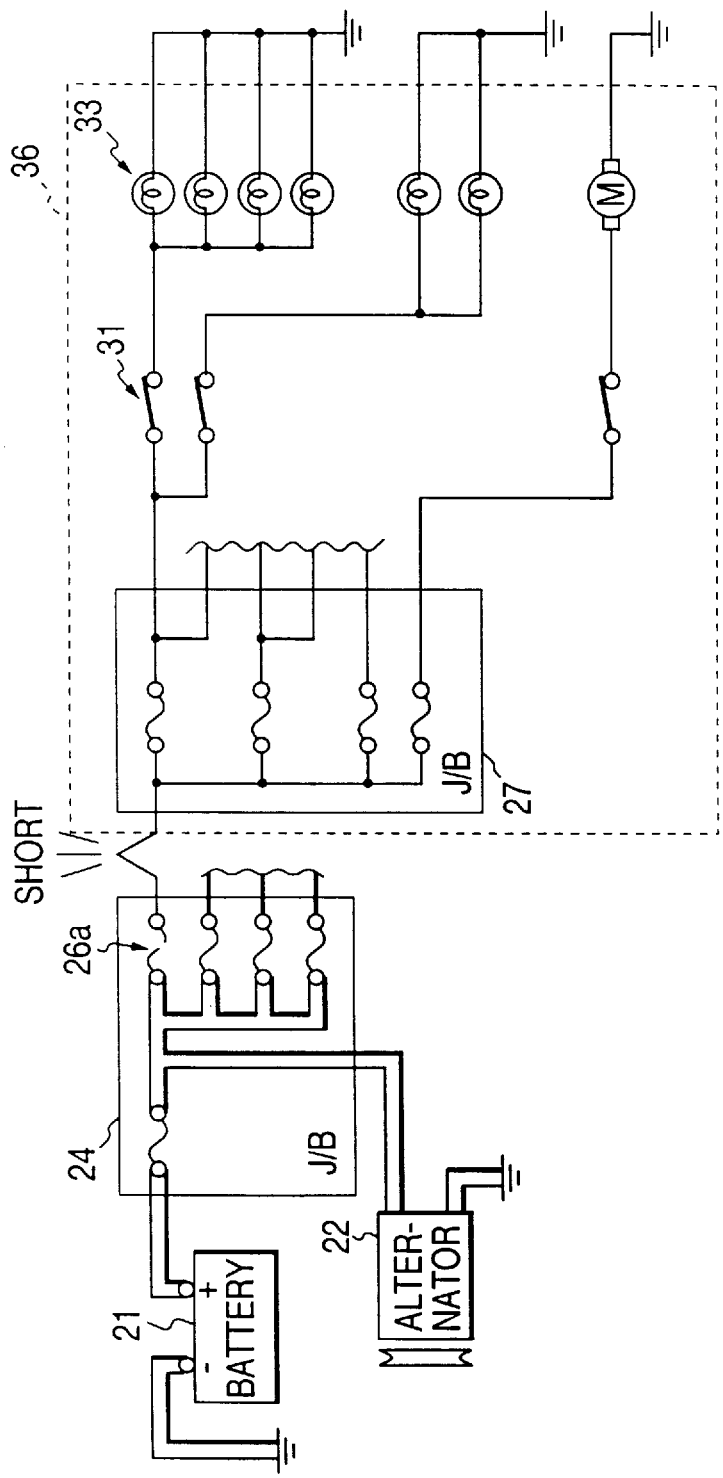
FIG. 10 is an illustration showing a problem in a case where a short circuit has taken place in the trunk line portion.

In a case where only the trunk line portion encountering a fault is disconnected (S33 to S38) if a fault, such as a short circuit, takes place, for example, in a case where an impact due to a traffic accident or the like causes the electric-power supply line 56 of the trunk line 55 between the electric connection boxes 48 and 50 to be broken as shown in FIGS. 5A and 5B, and thus the conductor of the electric wire of, for example, a wire harness comes in contact with an external conductor and a short circuit takes place, the current sensors 68*a* and 68*a* at the two ends of the electric-power supply line 56 between the electric connection boxes 48 and 50 detect respective current levels to monitor whether the levels coincide with each other. If the detected current level obtained by the two current sensors 68*a* and 68*a* do not coincide with each other, the control unit 56 controls the abnormal circuit between the supply switch control units 72 and 72 at the two ends through the connection/disconnection control unit 70. As a result, the electric-power supply line 56 encountering the short circuit is disconnected and separated from the two sides of the electric-power connection boxes 49 and 50 (S33). Moreover, the position of the trunk line portion encountering the fault is displayed with the alarm lamp or the alarm buzzer to issue an alarm to the driver (S34).

Similarly, in a case where the power supply line 56 of the trunk line 55 and the ground wire 57 between the electric connection boxes 48 and 50 are broken due to an impact of, for example, a traffic accident, as shown in FIG. 5A and thus a short circuit takes place due to contact of the conductors of the power supply line 56 of the trunk line 55 and the ground wire 57 or, for example, the wire harness, with another conductor, positive current flows from an intermediate position of the ground line 57 of the trunk line 55. The current sensors 68*a* and 68*a* at the two ends of the electric-power supply line 56 and the current sensor 69*a* and 69*a* detect respective current levels to monitor whether the levels coincide with each other. If the detected current level obtained by the two current sensors 68*a* and 68*a* and the current sensors 69*a* and 69*a* do not coincide with each other, the control unit 56 controls the abnormal circuit between the supply switch control units 72 and 72 at the two ends through the connection/disconnection control unit 70. As a result, the electric-power supply line 56 encountering the short circuit is disconnected and separated from the two sides of the electric-power connection boxes 49 and 50 (S33). Moreover, the position of the trunk line portion encountering the fault is displayed with the alarm lamp or the alarm buzzer to issue an alarm to the driver (S34).

Then, if electric power can be supplied to the electric connection box 50 through another circuit, the other supply switch control units 72 and 73 are switched to the other trunk line passage to make conductive the electric connection box 51 (S35). Moreover, switch of the trunk line portion is displayed with the alarm lamp or the alarm buzzer to issue an alarm to the driver (S36). If electric power cannot be supplied to the electric connection box 50 through another circuit, control is performed to switch all of the other supply switch control units 72 and 73 off (S37). Moreover, switching off of the power source is displayed together with the alarm lamp and the alarm buzzer to issue an alarm to the driver (S38).

Therefore, supply of electric power from the power supply portion 47 to, for example, the electric connection box 50 can be performed from the electric connection box 48 through the electric connection box 49 and the electric connection box 51, as shown in FIG. 5B. Moreover, electric power can directly be supplied from the electric connection box 48. Thus, either of the two systems of the trunk line passages can selectively be employed to supply electric power. Moreover, supply of electric power from the power supply portion 47 to the electric connection box 52 can be performed from the electric connection box 48 through the electric connection box 49, the electric connection box 51 and the electric connection box 53. Another passage from the electric connection box 48 to the electric connection box 50 may be used to supply electric power. Moreover, the at least two systems of the trunk line passages can selectively be switched such that the abnormal trunk line 55 is disconnected to receive electric power. If a short circuit takes place in a trunk line portion between, for example, the electric connection boxes 48 and 50, the foregoing line is a supply line connected to the electric connection box 50, to which important electric part loads for running of the vehicle, are connected. Therefore, the foregoing passage is disconnected and disconnection is alarmed to the driver. If the vehicle can be driven without any problem, another passage of the two systems of the trunk line passages which passes through the electric connection boxes 49 and 51 is employed to form a supply line. Also in this case, electric power is supplied to the electric connection box 52 through the electric connection boxes 49, 51 and 53. As a result, even if supply of electric power is inhibited by the protective circuit, normal electric part systems downstream from it can easily be made to be operable. That is, even if a supply line connected to the electric connection box 50, to which circuits important to drive the vehicle are connected, encounters a fault, such as a short circuit, switching to another electric power supply line can be performed as well as disconnection of the supply line encountering the fault. Therefore, the vehicle can temporarily be moved to a safety position.

Since the electric current supplied to each load and the operations of the loads are monitored to control supply of electric power, interruption of supply of electric power to the abnormal load and the position can be performed. Thus, other normal electric part systems, the operations of which have been inhibited simultaneously, can be made operable. Since the amounts of the electric currents for the electric part loads and the supply switch control portions are individually monitored to control the operations of the loads, also control is performed such that electric power is supplied to a required portion in a required quantity only when supply of electric power is required to drive the vehicle and operate the electric part for the vehicle. If a fault, such as a short circuit, takes place, a problem that electric power flows to the short-circuited portion in an unnecessary quantity can be prevented.

Moreover, a record of the abnormal portion can easily be obtained from the memory portion 64. Therefore, the abnormal portion can easily be detected so that the labor for repairing the portion is significantly reduced.

Although this embodiment has the structure such that the electric connection box 48 is supplied with electric power from the power supply portion 47 and the electric connection boxes 49 to 53 are supplied with electric power from the electric connection box 48 through one of two or more systems of the trunk line 55, the electric power supply line may be structured such that at least two passages are provided as only the electric power supply lines of the trunk line portions connection box connected to the electric part loads required to drive the vehicle.

In this case, even if supply of electric power through one of the electric-power supply lines is interrupted, only an important electric connection box connected to an electric part load required to drive the vehicle can be supplied with electric power through a residual electric-power supply line. Thus, downstream normal electric part systems can be supplied with electric power.

Although this embodiment has been described as a countermeasure against a short circuit, abnormal trunk line portions or an abnormal load can be disconnected similarly to the case where the short circuit has taken place even in a case of a disconnection or a fault of a load. Moreover, the contents of the fault can be stored in the memory portion 64. If the current sensor 67 detects that no electric current flows in the electric-power supply line for each of the various loads and the ground wire, though the switch signal has been detected similarly to the foregoing embodiment and supply of electric power to the load has been permitted in response to the switch signal, a determination is performed that the load or the electric-power supply line and the ground wire for the load have been disconnected or encountered a fault (except the short circuit) or another determination is performed that the upstream portion is disconnected or load encountered a fault (except the short circuit). Thus, the content of the fault and the abnormal portion are alarmed to the driver. Moreover, supply of electric power to the abnormal load and the electric-power supply, line connected to the load is interrupted. In a case where electric current does not flow in any one of the current sensors 68a to 68c and 69a to 69c though the current sensors 68a to 68c and 69a to 69c respectively monitor the amount of electric currents allowed to flow in the electric-power supply line 56 of the trunk line 55 and the ground line 57 in each of the electric connection boxes, the supply switch control units 72 and 73 are electrically conducted and a closed circuit for an electric current is formed, a determination is performed that the electric-power supply line 56 of the trunk line 55 for the portion in which no electric current flows or the ground line 57 is disconnected or the load has a fault (except the short circuit). The content of the fault and the abnormal portion are alarmed to the driver. Moreover, supply of electric power to the electric-power supply line 56 of the trunk line 55 for the abnormal portion or the ground line 57 is interrupted and electric power is supplied through another passage. The foregoing content of the fault are stored in the memory portion 64 in the electric connection box.

Although the foregoing embodiment is structured such that the current sensor 67, the current sensors 68a to 68e and the current sensors 69a to 69c comprise the current transformers (CT) or the like, a heat detection member, such as a thermo-couple or a thermistor, a shunt resistor and a hole device may be employed as the member for detecting the level of the electric current as well as the current transformer (CT).

As described above, according to the present invention, the plurality of the electric power distribution portions are selectively supplied with electric line through at least two systems of electric power lines. In accordance with an output value from the detection portion, the switch means disposed at the two ends of the two systems of the electric power lines are switched on/off. Therefore, if a fault takes place in an electric power line between the electric power distribution portions, control can be performed to disconnect the electric power line between the electric, power distribution portions encountering the fault by the switch in the branched portions at the two ends of the electric power line. Electric power can be supplied to another electric power distribution portion through the other electric power line of the two systems of the electric power lines. Thus, the normal electric part systems, the operations of which have been inhibited, simultaneously can be supplied with electric power.

Since the switch means provided for the electric power line for each of the various loads is switched on/of in accordance with the output value from the current detection portion for each of the various loads, only an electric power line connected to an abnormal load can be disconnected by the switch means if any one of the various loads encounters a fault. Thus, electric power can be supplied to the other normal loads connected to the other electric power line.

Since the contents of switching off performed by the switch means and the state where electric power has been supplied are recorded, the portion encountering the fault can easily be detected and repair of the abnormal portion can quickly be performed. The structure of the present invention can easily be adapted to a system to be mounted on a vehicle. Since the electric connection box is disposed adjacent to a portion in which the loads, to be mounted on the vehicle, are concentrated, the necessity of arranging the electric power line consisting of a multiplicity of electric power supply lines and ground wires for each of the various loads can be eliminated. Only a trunk electric power line consisting of a pair of the electric-power supply line and the ground wire is required to be wired. Therefore, advantages can be realized in space saving and preventing various troubles.

What is claimed is:

1. An electric power distribution system comprising: a plurality of electric power distribution portions for distributing electric power to a plurality of various loads; and a power supply portion connected to at least any one of said plural electric power distribution portions, with said plural electric power distribution portions being able to supply electric power to each other through at least two systems of electric lines and to said plurality of various loads through a plurality of branch lines, wherein said electric power distribution portions are provided with a plurality of detection portions for respectively detecting levels of electric currents in said at least two systems of electric lines and in said plurality of branch lines, plural switch means for respectively permitting/interrupting electric conduction through said at least two systems of electric lines and through said plurality of branch lines, and a control unit for controlling said switch means in correspondence with a detection portion among said plural detection portions which has output an abnormal value for a level of electric current in one of said at least two systems of electric lines and said plurality of branch lines as determined by comparison to predetermined normal values so as to make non-conductive said one system of electric lines or branch line from which the abnormal value has been detected.

2. The electric power distribution system according to claim 1, wherein at least either a content of control to switch said switch means off or a state where electric power has been supplied through said systems of electric lines or through said branch lines is recorded.

3. The electric power distribution system according to claim 1, wherein said control unit is structured to issue an alarm when said control unit has detected an abnormal value in output values from said plural detection portions.

4. The electric power distribution system according to claim 1, wherein said electric power distribution system is formed by a wire harness to be mounted on a vehicle, said electric power distribution portions are formed by electric connection boxes, and said electric connection boxes are disposed adjacent to loads on the vehicle.

5. The electric power distribution system according to claim 4, wherein said electric connection boxes are respectively connected to a variety of the loads.

6. The electric power distribution system according to claim 1, wherein said plural electric power distribution portions are supplied with electric power through one of said at least two systems of electric lines, and said control unit controls said switch means in correspondence with the detection portion among said plural detection portions which has output an abnormal value for a level of electric current in one of said at least two systems of electric lines so as to make non-conductive the system of electric lines from which the abnormal value has been detected and performs switching to one of said at least two systems of electric lines which has not been made non-conductive.

7. The electric power distribution system according to claim 6, wherein at least either a content of control to switch said switch means off or a state where electric power has been supplied through said systems of electric lines or through said branch lines is recorded.

8. The electric power distribution system according to claim 6, wherein said control unit is structured to issue an alarm when said control unit has detected an abnormal value in output values from said plural detection portions.

9. An electric power distribution system comprising: a plurality of electric power distribution portions for distributing electric power to a plurality of various loads; and a power supply portion connected to at least any one of said plural electric power distribution portions, with said plural electric power distribution portions being respectively supplied with electric power through electric lines and supplying electric power to said plurality of various loads through a plurality of branch lines, wherein said electric power distribution portions are provided with a plurality of detection portions for respectively detecting levels of electric currents in said electric lines and in said branch lines for supplying electric power to said plurality of various loads, plural switch means for respectively permitting/interrupting electric conduction of said electric lines and said branch lines for supplying electric power to said plurality of various loads and a control unit for controlling said switch means corresponding to a detection portion among said plural detection portions which has output an abnormal value for a level of electric current in one of said electric lines and branch lines as determined by comparison to predetermined normal values so as to make non-conductive said one electric line or branch line from which the abnormal value has been detected.

10. The electric power distribution system according to claim 9, wherein at least either a content of control to switch said switch means off or a state where electric power has been supplied through said electric lines or through said branch lines is recorded.

11. The electric power distribution system according to claim 9, wherein said control unit is structured to issue an alarm when said control unit has detected an abnormal value in output values from said plural detection portions.

12. The electric power distribution system according to claim 9, wherein said electric power distribution system is formed by a wire harness to be mounted on a vehicle, said electric power distribution portions are formed by electric connection boxes, and said electric connection boxes are disposed adjacent to loads on the vehicle.

13. The electric power distribution system according to claim 12, wherein said electric connection boxes are respectively connected to a variety of the loads.

* * * * *